2,978,878

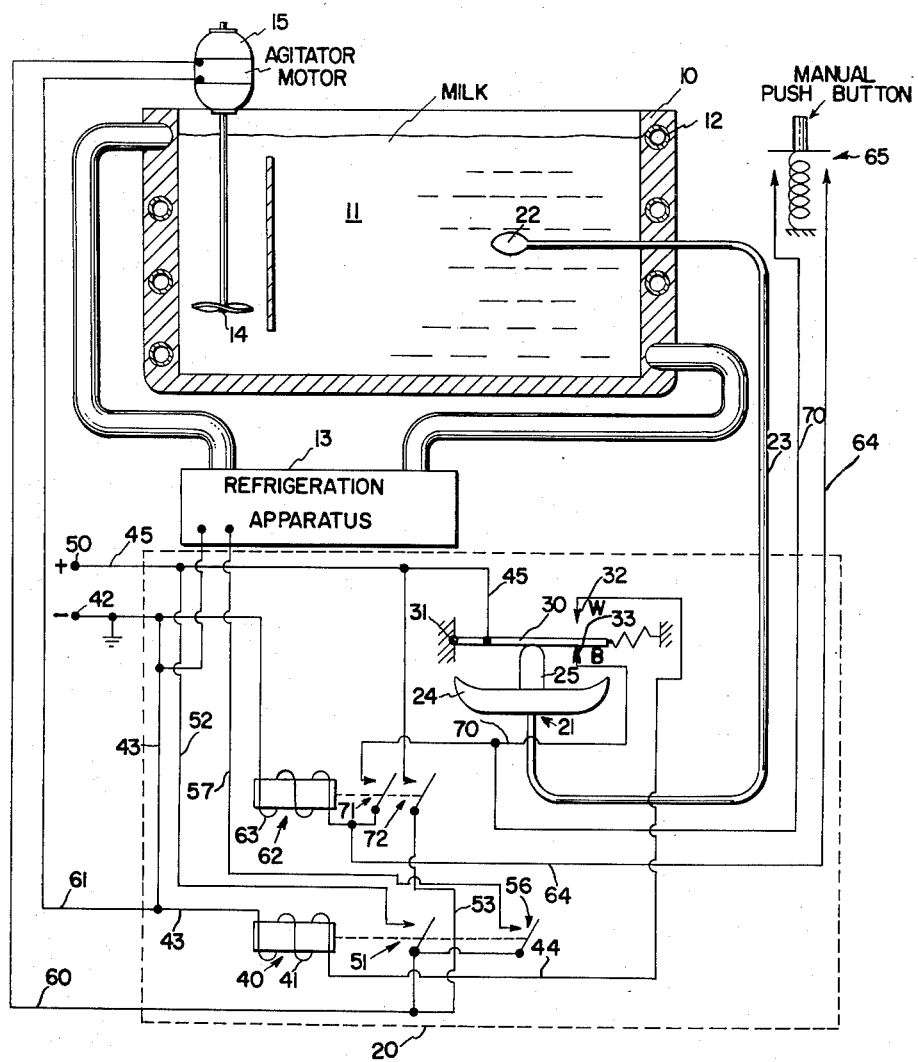

CONTROL APPARATUS FOR LIQUID COOLER

Aaron I. Curtis, Plymouth Township, Hennepin County, and William J. Larsen, St. Louis Park, Minn., assignors to Minneapolis-Honeywell Regulator Company, Minneapolis, Minn., a corporation of Delaware Filed Apr. 18, 1958, Ser. No. 729,365

5 Claims. (Cl. 62—162)

The present invention is concerned with control apparatus for providing auxiliary control of a condition changing device when the automatic control apparatus for the device is satisfied.

In bulk milk cooling systems, the milk tank is commonly cooled by a refrigeration apparatus. To insure efficient heat transfer, an agitator or pump is used to circulate the milk in the tank during the cooling operation. The refrigeration apparatus and agitator are energized when the temperature of the milk increases above a predetermined value.

When warm milk is added to the tank, the agitator should be energized for a short period, to prevent the warm milk from remaining near the top surface. Under automatic control, if the thermostat is satisfied, the agitator will not run until the temperature of the milk near the sensing element increases to the selected value. For some time the need of a simple and dependable means for independently energizing the agitator for a suitable length of time has been recognized.

The present invention provides for auxiliary operation of the agitator when a manual switch is closed by means of a circuit established through the thermostat.

It is therefore an object of the present invention to provide an improved condition control device for selective operation of the automatic control.

Another object of the present invention is to provide apparatus for additionally controlling a circulation device when the temperature control apparatus is satisfied.

These and other objects of the present invention will become apparent upon the study of the specification and drawing of which a single figure is a schematic representation of the control panel connected to a bulk milk tank cooling apparatus.

Referring to the single figure of the drawing, a tank 10 is shown containing milk 11. The milk is cooled by cooling coils 12 in the tank. The coils are connected to a conventional refrigeration apparatus or cooling unit 13. An agitator 14 driven by a motor 15 circulates milk in the tank to increase the heat transfer from the milk to the cooling coils 12. The agitator also prevents the stratification of the milk insuring a more even temperature.

A control panel 20 contains a conventional remote bulb thermostat 21. A bulb 22 is mounted to respond to the temperature of the milk in the tank 10. The bulb is connected by means of a capillary tube 23 to a pressure responsive device or diaphragm type operator 24; so that, upon an increase of the temperature of bulb 22, pin 25 moves upward to rotate lever 30 in a counter-clockwise direction around a pivot 31. The upper movement of the snap acting lever 30 closes a normally open switch 32 and opens a normally closed switch 33.

A relay 40 has a winding 41 connected to a source of power through a circuit as follows: from a ground terminal 42, a conductor 43, a winding 41, a conductor 44, normally open switch 32, a conductor 45, and back to the positive side 50 of the source of power. Upon the energization of relay 40, switches 56 and 51 are closed. The source of power is connected to refrigeration apparatus 13 through a circuit traced as follows: from terminal 50, a conductor 52, switch 51, switch 56, a conductor 58, refrigeration apparatus 13, and back to the ground terminal 42. At the same time that the refrigeration apparatus is energized, agitator motor 15 is energized through a circuit traced as follows: from terminal 50, conductor 52, switch 51, a conductor 60, motor 15, a conductor 61, and back to the ground terminal 42. From the circuit described, upon a call for cooling by thermostat 21, switch 32 closes to energize relay 40. Refrigeration apparatus 13 is energized and motor 15 is placed in operation to circulate the milk in tank 10.

A relay 62 has a winding 63 which is energized through a circuit traced as follows: from ground terminal 42, winding 63, a conductor 64, a switch 65, a conductor 70, normally closed switch 33, and back to the positive side of the source of power through conductor 45. Since switch 65 is of a spring return type requiring that it be held closed, a holding circuit is provided for relay 62. The holding circuit is traced as follows: from winding 63, a first normally opened switch 71 of relay 62, switch 33, and back to the positive side of the source of power through conductor 45. When relay 62 is energized, a second normally open switch 72 is closed to connect conductor 60 to the positive side of the source of power through the conductors 53 and 45, and agitator motor 15 is energized.

The normal operation of the apparatus connected to panel 20 is accomplished when the temperature of bulb 22 is increased above some predetermined value. Thermostat 21 closes switch 32 to energize relay 40 and bring about operation of the refrigeration apparatus 13 and agitator motor 15. The milk circulates in the tank, and when the temperature of the milk decreases below some predetermined value, the thermostat becomes satisfied to open switch 32 and to close switch 33.

Let us assume that warm milk is added to tank 10 in addition to a quantity of already cool milk in the tank. Without operation of agitator 14, the warm milk might remain near the top surface for some time. The bulb 22 might be at a temperature to satisfy thermostat 21, and operation of the refrigeration apparatus and agitator would not take place for a considerable period. All of this time, the warm milk near the top surface is susceptible to bacteria growth and spoilage. When bulb 22 becomes warm enough to operate thermostat 21, the agitator pump would circulate the milk to mix up the warm and the cold. The average temperature would be much higher than normally would be the case. A long period of operation of the refrigeration apparatus is then necessary before the average milk temperature is at a desirable value.

By means of manual switch 65, even when the thermostat 21 is satisfied, the agitator can be placed in operation. Thus upon the addition of warm milk to the tank, the operator closes switch 65 to insure that the warm milk is mixed up with the existing cool milk. The stratification is prevented, and the average temperature of the milk is maintained as close as possible to the desired value. The agitator motor 15 remains energized since relay 62 is held in an energized position by a holding circuit. When the thermostat again calls for cooling, the holding circuit is broken by switch 33 so that, continuous energization of the agitator motor is terminated as soon as the thermostat is satisfied.

While the present invention has been described as used in one particular environment, it is intended that the scope of the present invention be limited by the appended claims in which we claim:

1. In control apparatus for controlling refrigeration apparatus and a circulation device of a milk storage installation automatically and providing normal selective control of the circulation device, switch means having a normally closed contact and a normally open contact, temperature response means adapted to be responsive to the temperature of the stored milk, means connecting said responsive means to said switch means so that when the temperature of the milk is above a predetermined value said normally open contact is closed, first relay means adapted to control the refrigeration apparatus and the circulation device, means including said normally open switch for connecting said first relay means to a source of power, second relay means adapted to independently control the circulation device, a manually operated switch, circuit means including said manual switch and said normally closed switch connecting said second relay means to said source, and a holding circuit including said normally closed switch for maintaining said second relay means energized when said manual switch is open.

2. A control panel for a milk storage installation having a cooling unit and a milk circulation device comprising, temperature responsive means adapted to respond to the temperature of the stored milk, switch means, means connecting said temperature responsive means to control said switch means, said switch means having a first circuit which is closed when the temperature of the milk ish below a predetermined value and a second circuit which is closed when the temperature of the milk is above said predetermined value, relay means, a source of power, manual operated switch means, circuit means including said manual switch means and said first circuit for connecting said relay means to said source of power, said relay means being adapted to control the operation of said circulation device, a holding circuit for said relay means, said holding circuit comprising said first circuit whereby upon energzation of said relay means by closing said manual switch said relay means is maintained energized when the temperature of the milk is below a predetermined value, and electrical means including said second circuit adapted to energize both the cooling unit and the circulation device when the temperature of the milk is above a predetermined value.

3. A control panel for a milk storage installation having a cooling unit and a milk circulation device comprising, temperature responsive means adapted to respond to the temperature of the stored milk, switch means, means connecting said temperature responsive to control said switch means, said switch means having a first circuit which is closed when the temperature of the milk is below a predetermined value and a second circuit which is closed when the temperature of the milk is above said predetermined value, control means adapted to independently control the circulation device, manual operated switch means, electric circuit means including said manual switch means and said first circuit for connecting said control means to said source of power, circuit means comprising said first circuit whereby upon energization of said control means by closing said manual switch the circulation device is independently energized when the temperature of the milk is below a predetermined value, and electrical means including said second circuit adapted to energize both the cooling unit and the circulation device when the temperature of the milk is above a predetermined value.

4. Control apparatus for controlling the operation of a temperature conditioning apparatus and a circulation device in a milk storage installation comprising, a thermostat adapted to respond to the temperature of the milk, said thermostat having a switch adapted to control the energization of the conditioning apparatus and the circulation device when the temperature of the milk is above a selected value, said thermostat having a second switch providing a closed circuit when the temperature of the milk is below said selected value, relay means adapted to independently control the energization of the circulation device, a switch, electric circuit means including said switch and said closed circuit for energizing said relay means, and means including said closed circuit for maintaining energization of said relay means whereby the circulation device can be initially energized by said switch and remain energized as long as the temperature of the milk is below said selected value.

5. Control apparatus for controlling the operation of a medium temperature changing apparatus and a medium circulation device, temperature responsive means responsive to the temperature of the medium, said responsive means being adapted to control the energization of the changing apparatus and the circulation device whenever a level of said temperature is in a first range, actuator means adapted to independently control the energization of the circulation device, manually operated means, means including said manually operated means and said responsive means whenever said level of said temperature is in a second range for initiating energization of said actuator means, and means asociated with said actuator means for maintaining energization of the circulation device as long as said level of said temperature is in said second range.

References Cited in the file of this patent

UNITED STATES PATENTS

| | | |
|---|---|---|
| 2,101,261 | Martin | Dec. 7, 1937 |
| 2,358,756 | Zoller | Sept. 19, 1944 |
| 2,572,508 | Muffly | Oct. 23, 1951 |
| 2,697,195 | Courtney | Dec. 14, 1954 |